United States Patent
Downey

(10) Patent No.: US 7,165,809 B2
(45) Date of Patent: Jan. 23, 2007

(54) SAFETY SEAT TETHER SYSTEM

(75) Inventor: Brian Downey, Westland, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/005,483

(22) Filed: Dec. 7, 2004

(65) Prior Publication Data
US 2006/0138850 A1 Jun. 29, 2006

(51) Int. Cl.
A47C 1/08 (2006.01)
(52) U.S. Cl. .................. 297/253; 297/463.1; 297/463.2
(58) Field of Classification Search .............. 297/254, 297/463.1, 188.04, 188.05, 188.06, 485, 297/463.2
See application file for complete search history.

(56) References Cited

U.S. PATENT DOCUMENTS

| 4,215,900 | A | 8/1980 | Coult |
| 4,664,443 | A | 5/1987 | Casale |
| 5,332,285 | A | 7/1994 | Sinnhuber |
| 5,791,614 | A * | 8/1998 | Sims ................. 297/188.06 X |
| 6,267,441 | B1 | 7/2001 | Otero |
| 6,729,687 | B2 * | 5/2004 | Haverkamp ............. 297/254 X |
| 6,957,854 | B1 * | 10/2005 | Seastrom ........... 297/188.04 X |
| 2003/0132654 | A1 | 7/2003 | Okamoto et al. |
| 2003/0184138 | A1 | 10/2003 | Haverkamp |

* cited by examiner

Primary Examiner—Anthony D. Barfield
(74) Attorney, Agent, or Firm—Foley & Lardner LLP

(57) ABSTRACT

A guide mechanism for a safety seat tether includes a guide and at least one seat back attachment for securing the guide to a seat back. The guide is configured and positioned so as to prevent substantial contact of the tether with a top end of the back seat. The guide may also prevent pressure contact of the tether with upper portions of the front and back surfaces of the seat back. The seat back attachment cooperates with head sleeves on the top end of the seat back to secure the guide to the top end of the seat back.

20 Claims, 6 Drawing Sheets

SAFETY SEAT TETHER SYSTEM

BACKGROUND OF THE INVENTION

The present invention relates generally to the field of safety restraint systems. In particular, the invention provides systems and methods for guiding a safety seat tether.

In conventional systems, safety seats, such as child booster seats, are provided with a tether to secure the safety seat to the vehicle or to the car seat on which the safety seat is positioned. In this regard, a tether is typically provided to extend from the back of the safety seat to a latch behind the car seat. The tether may be tensioned to prevent substantial movement of the safety seat. The tension of the tether can cause the tether to deform the upholstery or the cushioning of the car seat, resulting in an undesirable seat appearance.

SUMMARY OF THE INVENTION

The disclosed embodiments of the present invention provide systems and methods for guiding a safety seat tether to prevent or limit deformation or decoloration of the car seat.

One aspect of the invention relates to a guide for a safety seat tether. The guide includes at least one seat back attachment for securing the guide to a seat back, the seat back having a top end, and at least one tether bar adapted to guide a tether around the top end, the tether bars being supported at least in part by the seat back attachments.

In a particular embodiment, the at least one seat back attachment includes at least one insert adapted to be inserted into a headrest sleeve of the seat back. The at least one insert may include two inserts adapted to be inserted into two corresponding sleeves of the seat back.

In a particular embodiment, the at least one tether bar includes at least two bars being spaced apart.

In another embodiment, the at least one tether bar includes a contact surface that contacts the tether, the surface being disposed sufficiently away from the seat back so as to prevent pressure contact of the tether with at least a front surface of the seat back. The contact surface may be contoured to guide the tether around the top end without substantial contact with the top end. In another embodiment, the contact surface is contoured to guide the tether to prevent substantial contact with a backside of the seat back.

In a particular embodiment, the seat back attachments and the at least one tether bar are integrally formed. The seat back attachments and the at least one bar may form a substantially continuous rod. In one embodiment, the rod includes bends to form transitions between two or more segments of the continuous rod. At least one of the segments may be either a seat back attachment or a tether bar. At least one of the segments may be a transition segment positioned between the at least one tether bar and one of another tether bar and a seat back attachment.

The rod may include two end segments each forming a seat back attachment; three central segments, each forming a tether bar; and one or more transition segments, each transition segment joining a central segment with at least one of another central segment and an end segment. In one embodiment, the rod is formed of a hollow tube.

In another aspect of the invention, a guide for a safety seat tether includes means for guiding a tether around a top end of a seat back and means for securing the means for guiding to the seat back.

In another aspect, the invention includes a safety seat tether guide system. The system includes a seat back for a vehicle seat, the vehicle seat being adapted to accommodate a safety seat, the seat back having a top end. The system also includes a tether guide, the tether guide including at least one seat back attachment for securing the guide to the seat back and at least one tether bar adapted to guide a tether around the top end of the seat back. The at least one tether bar extends substantially parallel to the top end and is supported at least in part by the seat back attachments.

In another aspect, the invention includes a guide for a safety seat tether. The guide includes a seat attachment having two legs for insertion into headrest sleeves positioned at a top end of a back of the seat, and a plurality of tether bars supported by the two legs and adapted to guide a tether around the top end of the seat back so as to prevent substantial contact of the tether with the top end.

Another aspect of the invention includes a method of tethering a safety seat positioned against a seat back. The method includes guiding a tether of the safety seat around a top end of the seat back by passing the tether over one or more tether bars, the tether bars extending substantially parallel to the top end and being supported at least in part by one or more seat back attachments. The method also includes securing a free end of the tether to a tether latch.

In another aspect of the invention, a method of securing a child safety seat to a car seat includes the steps of attaching one end of a tether to a back of the child safety seat, securing tether bars to a top end of a back of the car seat by means of attachments inserted into headrest sleeves of the car seat, guiding the tether around the top end of the care seat back by passing the tether over one or more tether bars, and securing another end of the tether to a tether latch. The tether bars are positioned above the top end such as to prevent the tether from contacting the top end when the child safety seat is secured.

BRIEF DESCRIPTION OF THE DRAWINGS

Exemplary embodiments will hereafter be described with reference to the accompanying drawings, in which.

DETAILED DESCRIPTION OF THE PREFERRED EMBODIMENTS

Figure 1:
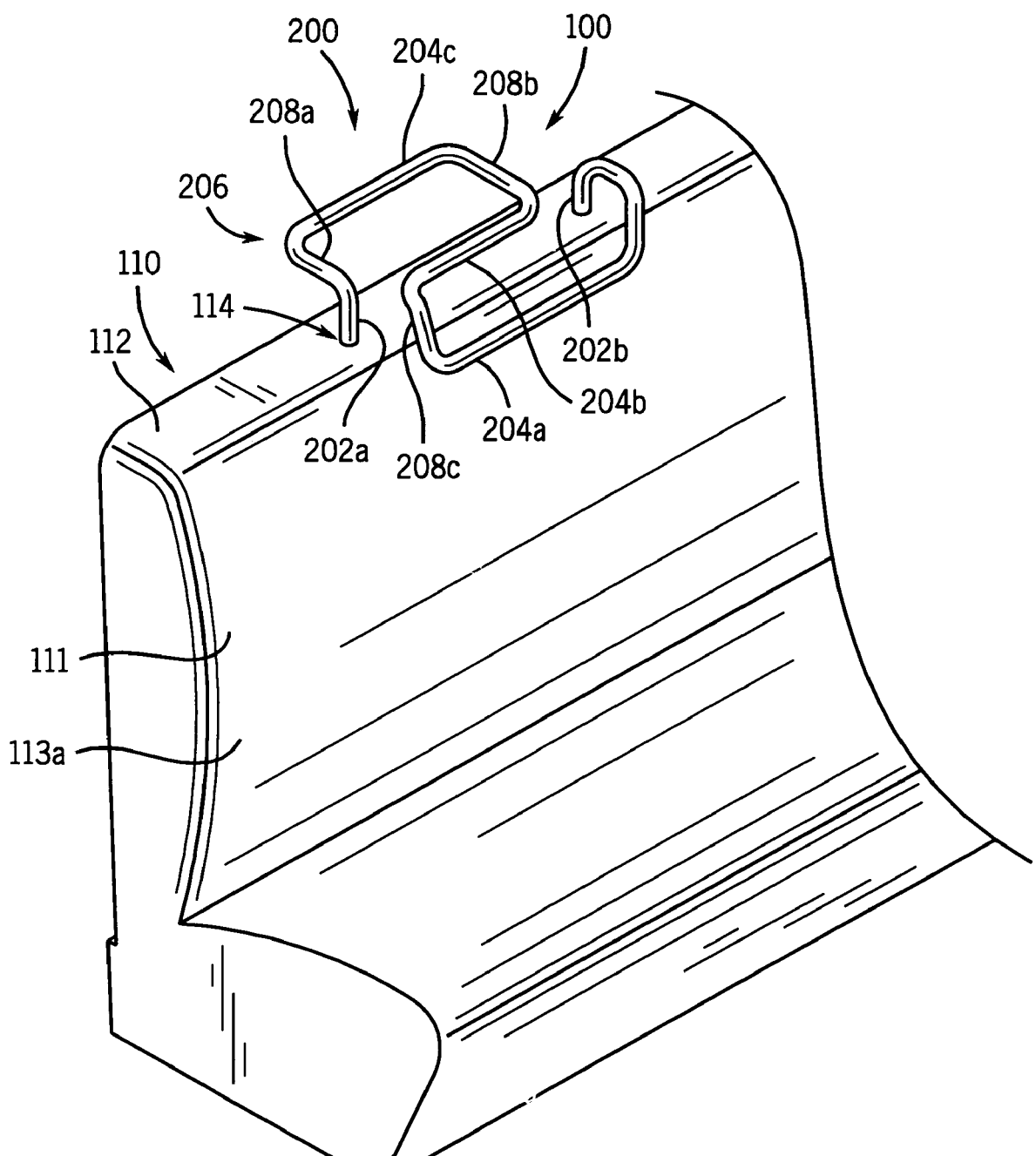
FIG. 1 is a perspective view of an embodiment of a safety seat tethering system according to the present invention.

Referring to FIG. 1, a perspective view of an embodiment of a system for tethering of a safety seat is illustrated. The tethering system 100 includes a car seat 110 having a seat back 111. The seat back 111 has a top end 112 adapted to accommodate at least one headrest. The seat back 111 has a front surface 113a and a back surface 113b (most clearly seen in FIG. 2C). The top end 112 of the seat back 111 is provided with headrest sleeves 114 to receive headrest inserts therein. The car seat 110 may be any seat in a vehicle, such as a rear seat or a middle row seat, as is commonly found in many minivans. The car seat 110 is adapted to accommodate thereupon a safety seat (shown in FIG. 2C), such as a child safety seat or a toddler booster seat, for example.

The tethering system 100 also includes a tether guide 200 adapted to guide a tether around at least the top end 112 of the seat back 111. In this regard, the illustrated tether guide 200 includes tether bars 204a–c positioned to guide a tether around the top end 112 of the seat back 111. In a particular embodiment, the tether guide 200 includes two or more tether bars 204 spaced apart. In this regard, the tether bars 204 are positioned to guide a tether so as to prevent substantial contact between the tether and the seat back 111, particularly the top end 112. In the illustrated embodiment, the tether guide 200 is provided with three tether bars 204a–c positioned substantially parallel to the top end 112 of the seat back 111.

The tether bars 204a–c are supported by seat back attachments 202a–b, which secure the tether guide 200 to the seat back 111. In the illustrated embodiment, the seat back attachments 202a–b are formed as inserts adapted to be inserted into the headrest sleeve 114. In the particular embodiment of FIG. 1, two inserts are provided to be inserted into two corresponding headrest sleeves of the seat back 111.

To support the tether bars 202a–c, transitional segments, such as transitional segments 208a–c, are provided between the tether bars 204a–c and either a seat back attachment 202a–b or another tether bar 204a–c. In this regard, the transitional segments 208a–c may be substantially perpendicular to the tether bars 204a–c.

The tether guide 200 may be formed in a variety of configurations. For example, the seat back attachments and the at least one tether bar may be integrally formed. In the particular embodiment illustrated in FIG. 1, the tether guide 200 is formed as a single continuous rod having various segments. The continuous rod may be formed of a variety of materials, such as a hollow metal tube. The segments include two end segments each forming a seat back attachment. The tether bars are formed by three central segments. Transitional segments are provided to allow the seat back attachments to support the tether bars. Accordingly, the transitional segments are positioned between a tether bar and either another tether bar or a seat back attachment.

The tether guide 200 includes bends, such as bend 206, in the continuous rod to form transitions between segments of the continuous rod. For example, the bend 206 forms a transition between the tether bar 204c and the transitional segment 208a. Similar bends are provided to form a transitions between the various other segments of the continuous rod.

Figure 2A:
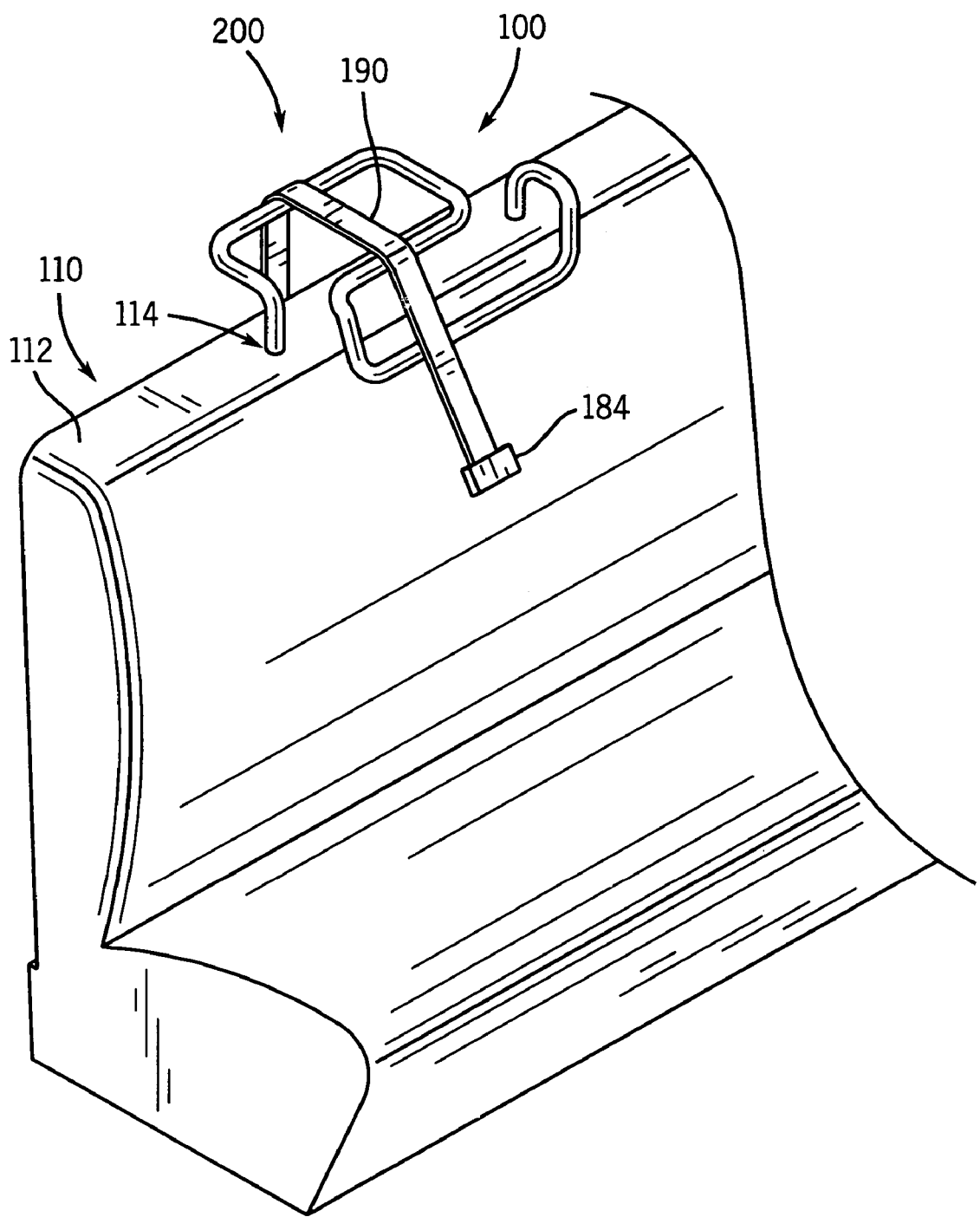
FIG. 2A is a front perspective view of the system of FIG. 1 with an exemplary tether.
Figure 2B:
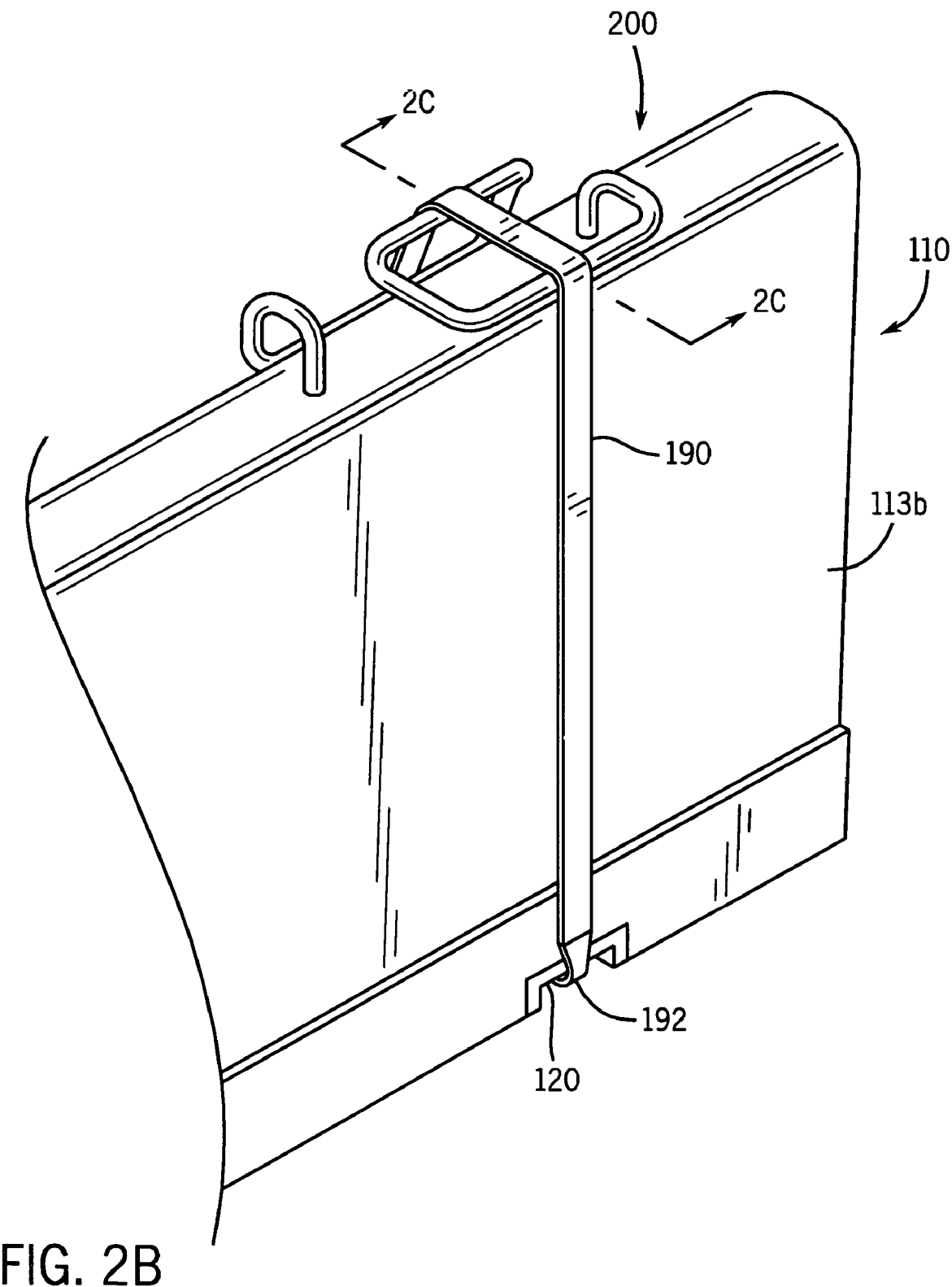
FIG. 2B is a rear perspective view of the system of FIG. 2A.
Figure 2C:
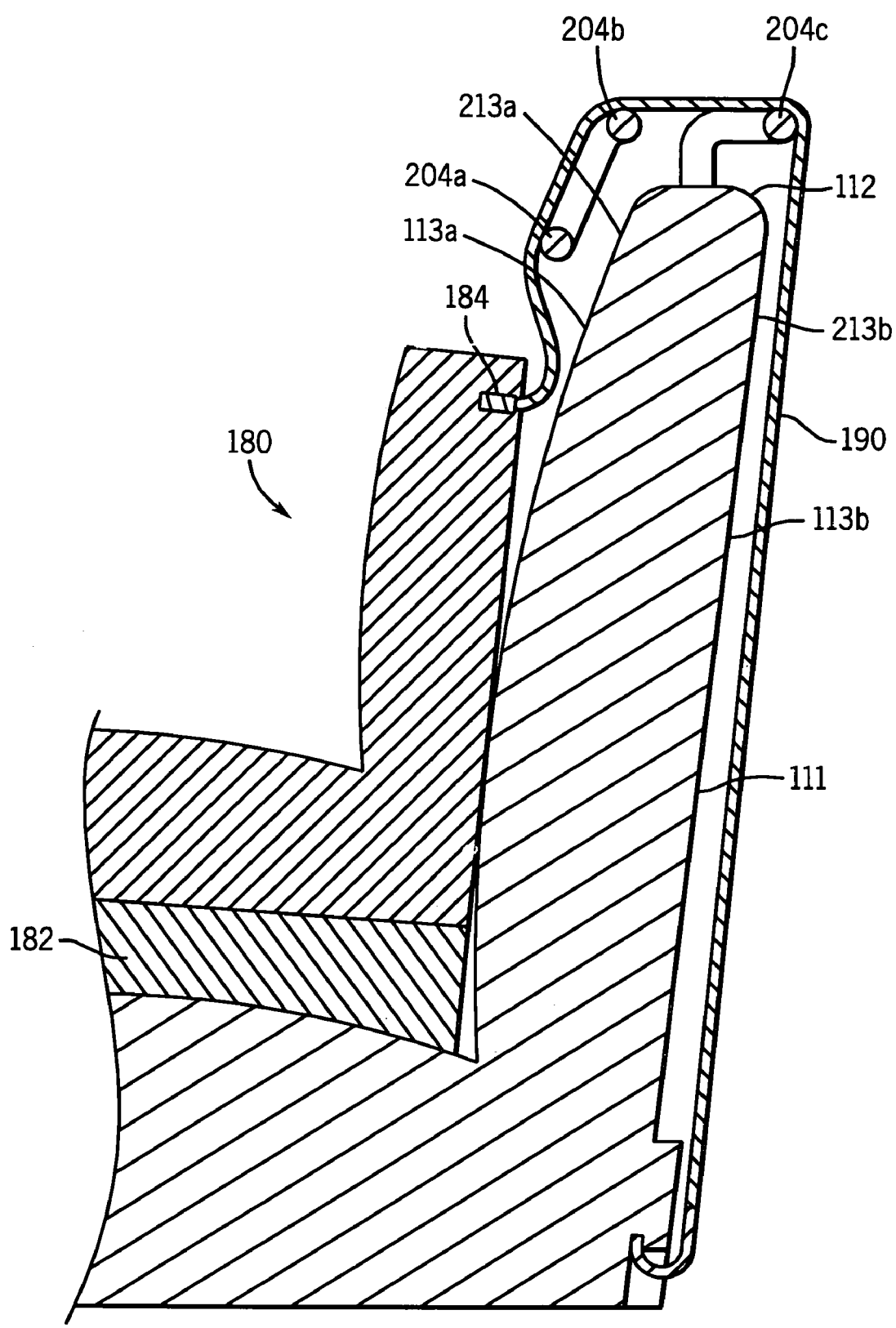
FIG. 2C is a cross-section side view of the system of FIGS. 2A and 2B.

FIGS. 2A–C illustrate the use of the tether guide 200 to secure a safety seat 180 (not shown in FIG. 2A for purposes of clarity). The safety seat 180 is positioned on the car seat 110 and may be mounted on a seat base 182. The safety seat 180 includes a tether 190 extending from a tethering point 184 on the safety seat 180. In securing the safety seat 180 to the vehicle or the car seat 110, the tether 190 is guided around the tether bars 204a–c of the tether guide 200. The positioning of the tether bars 204a–c allows the tether 190 to be guided so as to prevent substantial contact between the tether 190 and the top end 112 of the seat back. Moreover, depending upon the design of the safety seat 180 and the exact position of the tether point 184, the tether guide 200 may be effective to prevent pressure contact of the tether 190 with at least an upper portion of the front surface 113a of the seat back 111. Further, depending upon the exact design and shape of the back surface 113b of the seat back 111, the tether guide 200 may be effective to prevent pressure contact of the tether 190 with the back surface 113b of the seat back 111 or with at least an upper portion of the back surface 113b. As non-limiting examples, the upper portion of the front surface 113a and back surface 113b are shown in FIG. 2C at 213a and 213b respectively. The term "pressure contact" is used to indicate significant contact with the front or back surfaces 113a and 113b respectively such that removal of the tether would reveal an indentation or discoloration of the front or back surfaces 113a, 113b caused by the force of the tether 190 against the front or back surfaces 113a, 113b. A free end of the tether 190 is provided with a hook 192 adapted to engage a tether latch, such as a bar 120, positioned on the back of the car seat 110 (or alternately to a floor mounted support of the vehicle).

Figure 3:
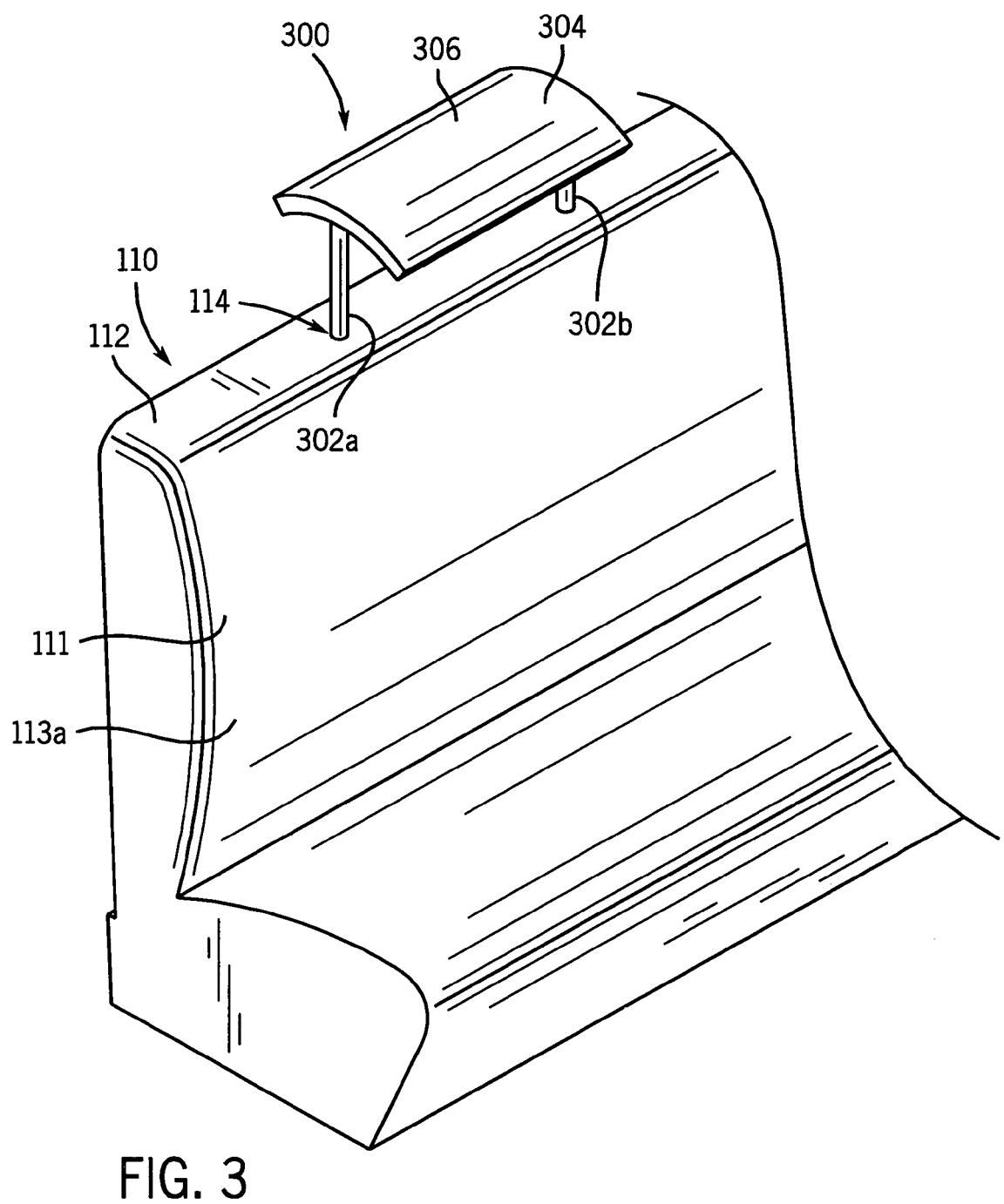
FIG. 3 is a perspective view of another embodiment of a safety seat tethering system according to the present invention.
Figure 4:
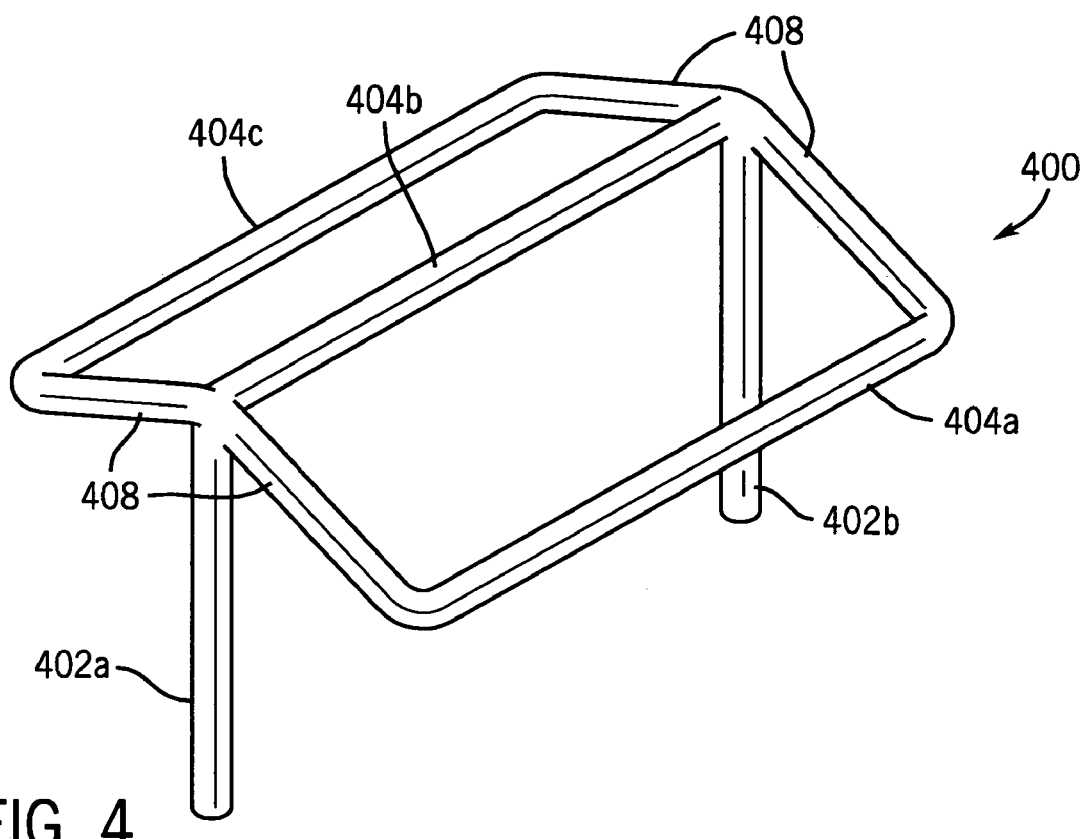
FIG. 4 illustrates a tether guide according to another embodiment of the invention.
Figure 5:
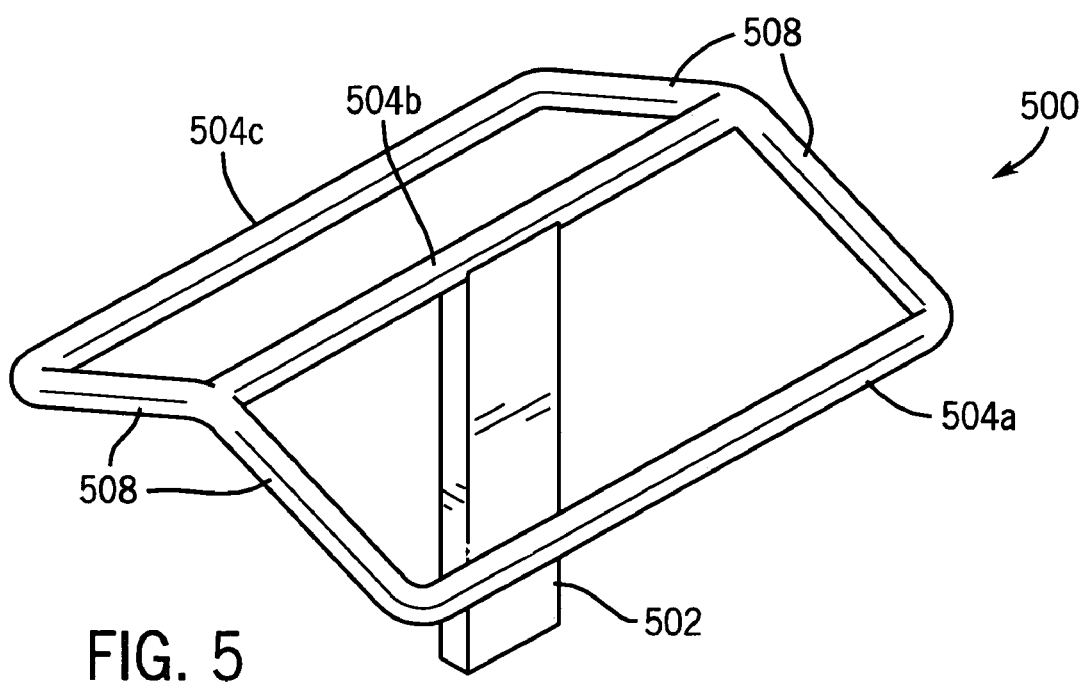
FIG. 5 illustrates a tether guide according to still another embodiment of the invention.

FIGS. 3–5 illustrate tether guides according to additional embodiments of the invention. First, with reference to FIG. 3, a tether guide 300 is provided with seat back attachments 302a–b and a tether bar 304 with a contact surface 306 for the tether. The contact surface 306 is contoured and disposed sufficiently away from the seat back 111 so as to guide the tether around the top end 112 of the car seat 110 without substantial contact with the top end 112, as well as without pressure contact with at least an upper portion of the front and back surfaces 113a, 113b (see FIG. 2C) of the seat back 111.

Referring now to FIG. 4, a tether guide 400 is provided with seat back attachments 402a–b and tether bars 404a–c. Unlike the embodiment of FIGS. 1–2C, the tether guide 400 is not configured as a continuous bar, but rather includes two transitional segments 408 branching from each seat back attachments 402a–b. The tether bars 404a–c extend from the end of each transitional bar 408 and from the intersection of the transitional bar 408 and the seat back attachment 402.

Referring now to FIG. 5, a tether guide 500 similar to the tether guide 400 of FIG. 4 is provided. The tether bar 500 includes a single seat back attachment 502 adapted to engage a seat back having a single headrest sleeve. The seat back attachment 502 is preferably provided with a rectangular cross-section to prevent rotational movement.

Thus, the embodiments of the present invention provide a convenient way of guiding a seat back tether without substantially deformation or discoloration of the seat.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims

What is claimed is:

1. A safety seat tether guide system, comprising:
a vehicle seat having a seat back with a top end, the vehicle seat being adapted to accommodate a safety seat; and
a tether guide, the tether guide comprising:
at least one seat back attachment for securing the guide to the seat back; and
at least one tether contacting structure adapted to guide a tether around the top end of the seat back,
wherein the at least one tether contacting structure extends in front of and in back of the at least one seat back attachment and extends substantially parallel to the top end and being supported at least in part by the at least one seat back attachment, wherein the seat back includes at least one headrest sleeve, and wherein said at least one seat back attachment is adapted to be inserted in said at least one headrest sleeve.

2. The system of claim 1, further comprising:

a tether latch adapted to secure a free end of the tether.

3. The system of claim 2, wherein the tether latch is a tether rod adapted to receive a hook on the free end of the tether.

4. The system of claim 3, wherein the tether rod is positioned on a back side of the seat back, wherein a front side of the seat back being opposite the back side and being adapted to receive the safety seat therein.

5. The system of claim 1, wherein the at least one tether contacting structure is adapted to guide the tether around the top end of the seat back without substantial contact with the top end.

6. The system of claim 1, wherein the at least one headrest sleeve includes two headrest sleeves, and wherein the at least one seat back attachment includes two seat back attachments adapted to be inserted into the two headrest sleeves of the seat back.

7. The system of claim 1, wherein the at least one tether contacting structure comprises at least two tether bars being spaced apart from one another.

8. The system of claim 1, wherein the tether contacting structure comprises a contact surface that is adapted to contact the tether, and wherein the contact surface is disposed sufficiently away from the seat back attachment so as to prevent pressure contact of the tether with at least an upper portion of a front surface of the seat back.

9. The system of claim 8, wherein the contact surface is contoured to guide the tether so as to prevent pressure contact with at least an upper portion of a back surface of the seat back.

10. The system of claim 8, wherein the contact surface is contoured to guide the tether to prevent substantial contact with a back surface of the seat back.

11. The system of claim 1, wherein the at least one seat back attachment and the at least one tether contacting structure are integrally formed.

12. The system of claim 11, wherein the at least one seat back attachment and the at least one tether contacting structure form a substantially continuous rod.

13. The system of claim 12, wherein the rod includes bends to form transitions between two or more segments of the continuous rod.

14. The system of claim 13, wherein at least one of the two or more segments is either the seat back attachment or a tether bar.

15. The system of claim 13, wherein the tether contacting structure comprises at least two tether bars, and wherein at least one of the two or more segments is a transition segment positioned between at least one of the at least two tether bars and one of the seat back attachment and another of the at least two tether bars.

16. The system of claim 12, wherein the seat back attachment comprises two end segments of the rod, wherein the at least one tether contacting structure comprises three central segments and one or more transition segments, wherein one central segment is a first tether bar, one central segment is a second tether bar, and the third central segment is a third tether bar, and wherein each transition segment joins a central segment with at least one of another central segment and an end segment.

17. The system of claim 12, wherein the rod is formed of a hollow tube.

18. The system of claim 1, wherein the at least one tether contacting structure comprises a plurality of tether bars supported by the at least one seat back attachment, and wherein the plurality of tether bars comprises at least two sets of substantially parallel tether bars.

19. The system of claim 18, wherein one set of the at least two sets of substantially parallel tether bars comprises at least three tether bars.

20. A safety seat tether guide system, comprising:

a vehicle seat having a seat back with a top end, the vehicle seat being adapted to accommodate a safety seat;

a tether latch adapted to secure a free end of a tether; and a tether guide, the tether guide comprising:

at least one seat back attachment for securing the guide to the seat back; and at least one tether contacting structure adapted to guide the tether around the top end of the seat back, wherein the at least one tether contacting structure extends in front of and in back of the at least one seat back attachment and extends substantially parallel to the top end and being supported at least in part by the at least one seat back attachment.

* * * * *